(12) United States Patent
Behi et al.

(10) Patent No.: US 6,291,560 B1
(45) Date of Patent: *Sep. 18, 2001

(54) METAL/CERAMIC COMPOSITE MOLDING MATERIAL

(75) Inventors: Mohammad Behi, Lake Hiawatha; Michael Zedalis, Mendham; Richard Lewis Duyckinck, Ringoes; Joan Burlew, Rockaway, all of NJ (US)

(73) Assignee: AlliedSignal Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/259,794

(22) Filed: Mar. 1, 1999

(51) Int. Cl.⁷ .................................................. C08L 5/12
(52) U.S. Cl. ........................ 524/27; 524/55; 264/109
(58) Field of Search ................... 264/109, 621, 264/328.2; 419/36; 524/27, 55

(56) References Cited

U.S. PATENT DOCUMENTS

| 4,734,237 | 3/1988 | Fanelli et al. | 264/122 |
| 5,250,251 | 10/1993 | Fanelli et al. | 264/328.2 |
| 5,258,155 | * 11/1993 | Sekido et al. | 264/109 |
| 5,286,767 | 2/1994 | Rohrbach et al. | 524/27 |
| 5,397,520 | 3/1995 | Rohrbach et al. | 264/122 |
| 5,746,957 | * 5/1998 | Fanelli et al. | 264/109 |

FOREIGN PATENT DOCUMENTS

WO 92/17421  10/1992  (WO).
WO 99/62660  12/1999  (WO).

OTHER PUBLICATIONS

Selby, H.H., "Agar", Industrial Gums, Academic Press, New York, NY, 2nd ed., 1973, Chapter 3, p. 29.
U.S. Patent application Ser. No. 08/869,053. "Aluminum Oxide–Based Molding Compound."

* cited by examiner

Primary Examiner—Mary Lynn Theisen
(74) Attorney, Agent, or Firm—Roger H. Criss

(57) ABSTRACT

A composite molding compound comprising a combination of metal and ceramic powders is disclosed. The powders are combined with a binder, a liquid carrier and other processing additives in a manner to provide uniform distribution of two phases in a material format that facilitates the molding of complex parts at relatively low pressures and temperatures using conventional injection molding machines. The products formed from these molding compounds may be designed with tailored physical and mechanical properties such as thermal conductivity, thermal expansion coefficient, density, elastic modulus and wear properties.

9 Claims, 3 Drawing Sheets

METAL/CERAMIC COMPOSITE MOLDING MATERIAL

FIELD OF THE INVENTION

This invention relates to composite molding compounds comprising a combination of metal and ceramic powders for forming various complex-shaped parts at relatively low temperatures and pressures in conventional injection molding equipment. Various metal/ceramic composite compounds of widely varying compositions are used to form high quality, net or near-net shape parts, which exhibit excellent homogeneous distribution of the metal and ceramic particles in the composition in both the "green" (unfired) and fired states. The finished parts require little or no machining, have superior properties and do not experience the cracking, distortion and shrinkage problems associated with prior art sintered products.

BACKGROUND OF THE INVENTION

Metal/ceramic composites are important specialized materials that are used in a variety of technical applications, e.g., gas turbine engine valves, pumps and other high-wear components, electrical and electronic connectors, and heat sinks. In addition they are used in a multitude of other applications where there is a need to reduce the weight and cost of a material. These composites are difficult to produce in a uniformly dispersed, intimately mixed composition by state-of-the-art processing methods, such as dry pressing or conventional metal casting, in which the ceramic powder is added to the molten metal prior to pouring. The problem of producing uniform composite materials is especially severe at high loadings of the ceramic component, upwards of about 25 vol %.

Metal/ceramic composites offer several distinct advantages to the materials user for certain applications. For example, the composite can have lower weight and higher elastic modulus than the metal component, and greater toughness than the ceramic component. These composites are frequently composed of a continuous metal phase with a ceramic particulate or fiber or a combination of both as a reinforcement phase. Obtaining uniform distribution of the reinforcement phase represents one of the main objectives in producing these composite materials. Indeed the distribution of the particulate phase has a great effect on the final properties of the composite material.

Various techniques have been employed to produce metal/ceramic composite materials. Techniques such as liquid metal pressure casting of ceramic preforms are considered to be relatively high in cost. In the molten metal mixing process, which is considered to be a relatively low cost technique, ceramic powder is mixed with molten metal to produce wrought products or shape castings. The molten composite has to be stirred continuously prior to and during the casting process in order to maintain the particle suspension and minimize the segregation of the ceramic powder in the mixture. Uniform distribution of ceramic particles is very difficult to achieve due to large differences in specific gravity between the metal and ceramic components (e.g., densities of steel and aluminum oxide powder are approximately 7.8 g/cm$^3$ and 3.99 g/cm$^3$, respectively).

The processing behavior of the molten metal exemplified by the rheology, sedimentation, reactivity, and fluidity is also affected by the particulate phase. These factors must be controlled carefully when a molten metal composite is used for shape casting. For example, the presence of ceramic particulates in molten aluminum increases the original viscosity of 10$^3$ poise substantially and changes the rheology to non-Newtonian.

Invariably the viscosity of molten metal increases as the volume fraction of the reinforcement phase increases and particle size decreases. This effect causes significant mold design limitations for casting complex-shaped parts. Sedimentation due to differences in specific gravity between melt and reinforcement particles is one of the limitations of the shape casting process. The settling rate is greatly affected by the shape, size and volume fraction of the reinforcement particles.

The dry pressing process for making composite parts also suffers from distribution problems due to density differences between ceramic and metal powders. Particle segregation can occur during the blending, die-filling and pressing steps.

The present invention provides readily moldable metal/ceramic composite feedstock compounds suitable for injection molding complex parts that circumvent the problems associated with current state-of-the-art shape forming methods. These compounds overcome the shortcomings of other state-of-the-art shape forming methods by providing a uniform distribution of the reinforcement particles. The molding compounds disclosed herein comprise ferrous and/or nonferrous metal powders and ceramic powders in the form of oxides, carbides, nitrides, borides, silicides or combinations of these powders as reinforcement particles. The volume fraction of the reinforcement particles can vary from 0.1 to 99 vol % depending on the type of application for the composite. Water is used as the liquid carrier, and the metal/ceramic composite feedstock compound can be injection molded at low temperatures (approximately 80 to 90° C.) and low pressures (approximately 500 to 1000 psi) to produce net or near-net shape articles. The unfired (green) molded articles can be dried and sintered according to specific sintering schedules for the composition being used in order to achieve the final desired properties.

Injection molding is recognized as a premier forming method for rapidly producing close tolerance net shape, complex parts in high volume. In Fanelli et al, U.S. Pat. No. 4,734,237, and U.S. patent application Ser. No. 08/869,053, the disclosures of both of which are incorporated herein by reference, processes for successfully molding net shape, complex parts in high volume are described.

BRIEF DESCRIPTION OF THE DRAWINGS

The invention will be more fully understood and further advantages will become apparent when reference is made to the following detailed description and the accompanying drawings in which.

SUMMARY OF THE INVENTION

Figure 1:
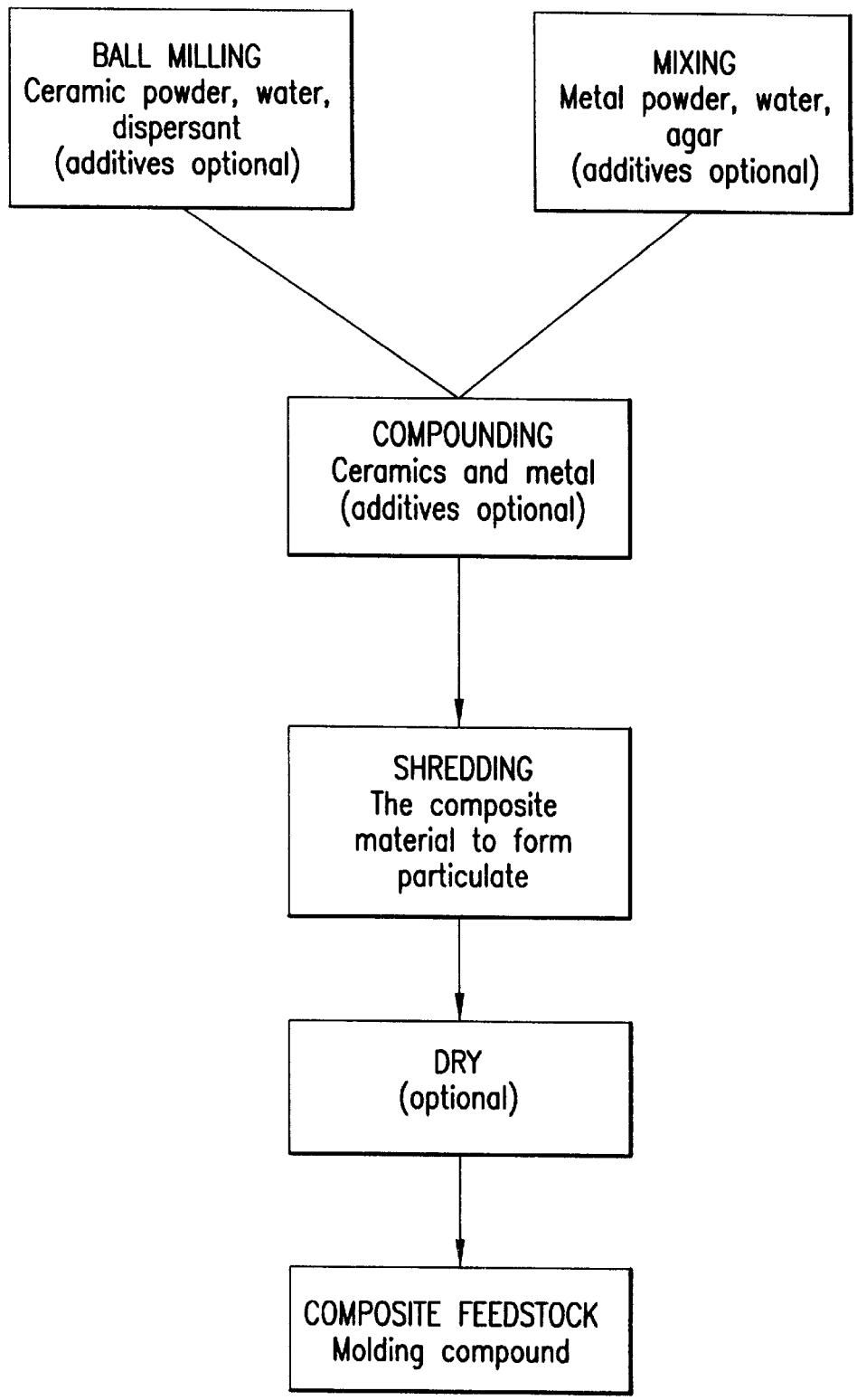
FIG. 1 is a schematic representation of the basic steps of formulating the composite molding compound according to one embodiment of the invention.

The invention is directed to a composite molding compound for forming complex-shaped parts comprising a mixture of a metal powder and a ceramic powder, a gel-forming material selected from the group of polysaccharides consisting of agaroids, and a gel-forming material solvent, the mixture being formulated in a blender that provides shearing action thereto and the blender being heated to raise the temperature of the mixture to about 75 to 100° C.

The invention also provides a method for producing a homogeneous composite molding compound comprising the steps of mixing a metal powder with water and a gel-forming material selected from the group of polysaccharides consisting of agaroids, mixing a ceramic powder with water and a dispersant, and ball milling the mixture to reduce the particle size thereof, compounding the metal powder mixture and the ceramic powder mixture, and shredding the compound mixture into a particulate format.

The invention further provides a process for forming an article from a composite molding compound comprising the steps of formulating a composite mixture of a metal powder and a ceramic powder, a gel-forming material selected from the group of polysaccharides consisting of agaroids, and a gel-forming material solvent, the mixture being formulated in a blender that provides shearing action thereto and the blender being heated to raise the temperature of the mixture to about 75 to 100° C., supplying the mixture at a temperature above the gel point of the gel-forming material into an injection molding machine, and molding the mixture under conditions of temperature and pressure to produce a self-supporting article. After being allowed to dry, the article is then fired according to a sintering schedule for the composite material being used to obtain the desired properties for the finished article.

DETAILED DESCRIPTION OF THE INVENTION

The present invention provides aqueous, metal/ceramic composite molding compounds and a method for compounding the constituent materials into a homogeneous mixture and format that is useful for manufacturing finished parts by injection molding. Metal/ceramic molding compounds refer to compositions containing ferrous and/or nonferrous metal and metal alloy powders in combination with ceramic powders. The compositions may comprise 0.1 vol % to greater than 99 vol % ceramic powder in the form of oxides, carbides, nitrides, borides and suicides also used singly or as a mixture of two or more of these powders in the metal matrix. The composite molding compounds also contain water, a binder selected from the agaroid family of polysaccharides, and minor amounts of other additives that improve the processability of the composite molding feedstock. Advantageously, the composite molding compounds disclosed herein contain a mixture of the essential ingredients for shape-forming parts by injection molding and will yield homogeneous metal/ceramic composite finished parts after firing.

Agaroids act as a binder that allows the fluidized mixture to set during :the injection molding process and then be removed as a self-supporting structure. An agaroid has been defined as a gum resembling agar but not meeting all of the characteristics thereof [See H. H. Selby et al., "Agar", *Industrial Gums*, Academic Press, New York, N.Y., $2^{nd}$ ed., 1973, Chapter 3, p.29]. As used herein, however, agaroid not only refers to any gums resembling agar, but also to agar and derivatives thereof such as agarose. Agaroids are used in the present invention because they exhibit rapid gelation within a narrow temperature range, a factor that can dramatically increase the production rate of injection molded articles. The preferred gel-forming materials are those which are water-soluble including agar, agarose or carrageenan, with the most preferred materials being agar, agarose and mixtures thereof.

The invention also provides a method for producing metal/ceramic composite molding compounds. According to a preferred method, the metal powder is initially mixed with a gel-forming material and water, which is a solvent for the gel-forming material. The gel, which is used as a binder in this composite compound, is from the group of polysaccharides known as agaroids such as agar, agarose or mixtures thereof. This type of binder is water-soluble and provides excellent flow characteristics and rapid gelation within a specific temperature range, important attributes that can dramatically increase the production rate of articles by the injection molding process. Ceramic powder is added to the mixture in the form of oxides, carbides, nitrides, borides and suicides, or combinations of two or more of these, ranging from about 0.1 to greater than 99 vol %. A preferred range is from about 15 to 75 vol %, and the most preferred range is from about 15 to 40 vol %. Water is conveniently and advantageously used as a liquid carrier for the solid constituents in the mixture to facilitate transport of the feedstock material along the barrel of an injection molding machine to the mold within the machine. Water is also a solvent for the gel-forming agaroid binder, and because of its relatively low boiling point it is easily removed from the molded part prior to and/or during sintering. The required amount of water to be added to the molding compound is dependent on the desired theological characteristics for optimum behavior of the composite material during the injection molding process. According to the present invention, the required amount of water in the formulation is between about 5 to 30 wt % of the mixture, with amounts between about 8 to 20 wt % being preferred. Small amounts of other additives may also be added to the mixture to serve a number of useful purposes, such as gel-strength enhancing agents and additives to preserve the functional effectiveness of the binder and the shelf life of the composite molding compound.

It should be understood that the metal and ceramic powders could be initially mixed together with a gel-forming material and water instead of adding the ceramic powder to the metal powder mixture, as described above. Substantially similar results are obtained using this method.

The ceramic powder is generally processed to reduce the particle size before being mixed with the metal powder. The ceramic material can be in the form of a dry powder or slip. Raw ceramic powders usually require deagglomeration processing before they can be used in order to prevent cracks, distortions and non-uniform distribution of the ceramic particles in the composition and to optimize the average particle size distribution. A number of different methods can be employed to accomplish the deagglomeration processing. One such method is ball milling, which is employed in the present invention to reduce the particle size of the ceramic powder before it is mixed with the metal powder. The use of dispersants and pH control agents are well known for improving the rheology and processability of ceramic suspensions. In the present case dispersants based on polyacrylates and polymethylmethacrylate polymer backbones, and tetramethyl-ammonium hydroxide as a pH control agent are successfully employed to optimize the rheology of the ceramic powder. The ceramic powder may be added to the batch as a form of slip comprising about 5 to 25 wt % water based on the total weight of the ceramic powder, or it may be dried after processing and added as a dry powder. The amount of dispersant used for processing the ceramic powder is about 0.1 to 3 wt %, and the pH is adjusted to a value between approximately 8.8 to 10.

The invention further provides a method for combining all of the various con- stituents of the composite molding compounds into a homogeneous feedstock material for producing homogeneous composite molded articles that can be fired without cracking. The metal powder and, optionally, other additives such as biocides to prevent bacterial growth and metal borates to improve the gel strength of molded articles are incorporated with the binder/water mixture at temperatures ranging from about 75 to 95° C. for a period of about 30 to 120 minutes. The ceramic powder material can be added to the mixture as a form of slip or dry powder during the last 15 to 45 minutes of the mixing time. Mixing can be done in a number of different efficient mixers such as sigma or planetary type mixers. Since the molding compound must be in a proper format that is capable of being fed continuously into an injection molding machine, the homogeneous composite mixture is allowed to cool below the gelling point of the binder (<37° C.) and then removed from the mixer. The mixture is placed in a shredder of a type commonly used in food processing, having a rotating cutter blade, and shredded into a particulate format. The moisture content of the shredded feedstock may be adjusted by exposing the material to the atmosphere and evaporating any excessive moisture. The shredded composite feedstock is now capable of being fed directly into the hopper of an injection molding machine. The useful solids level (wt % of solid material in mixture) in the molding compounds is in the range of approximately 75 to 88 wt %. It should be pointed out that the composite feedstock material could also be prepared using continuous processing such as a twin-screw continuous compounder.

Figure 2:
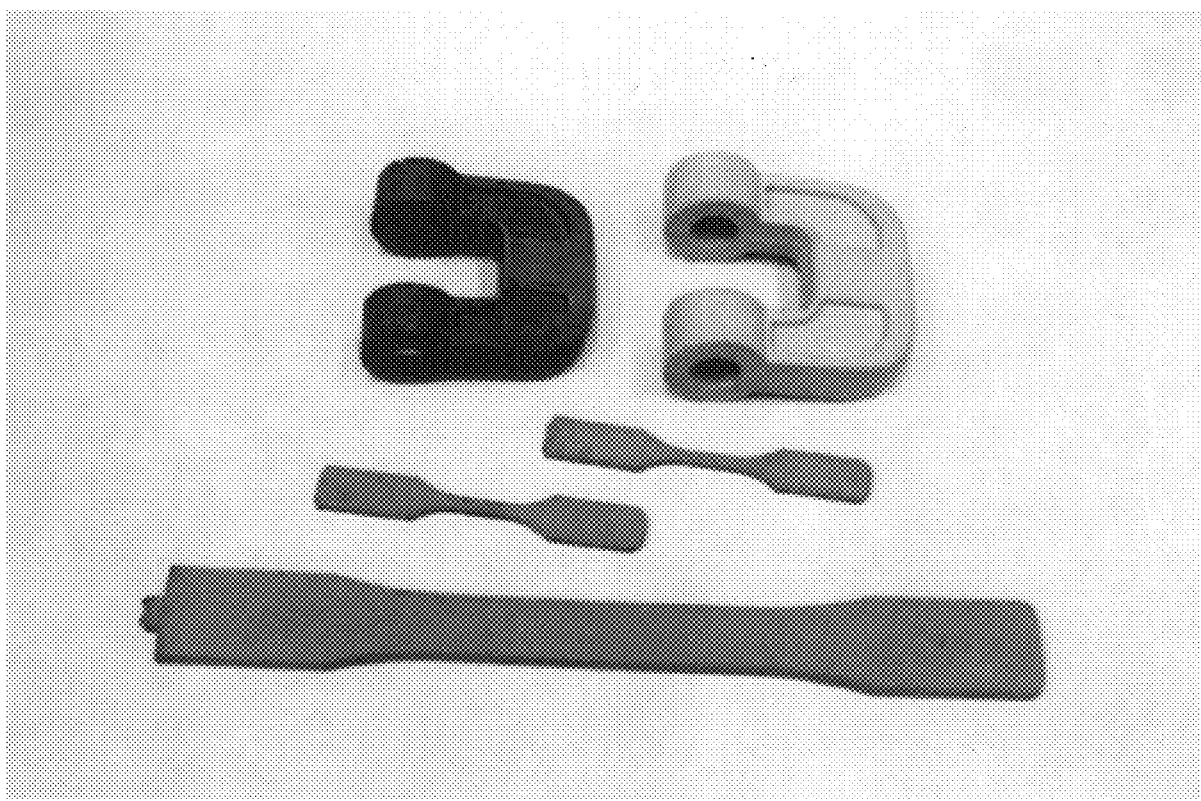
FIG. 2 is a photograph showing examples of green and fired composite parts made from composite feedstock material in a conventional injection molding machine.
Figure 3A:
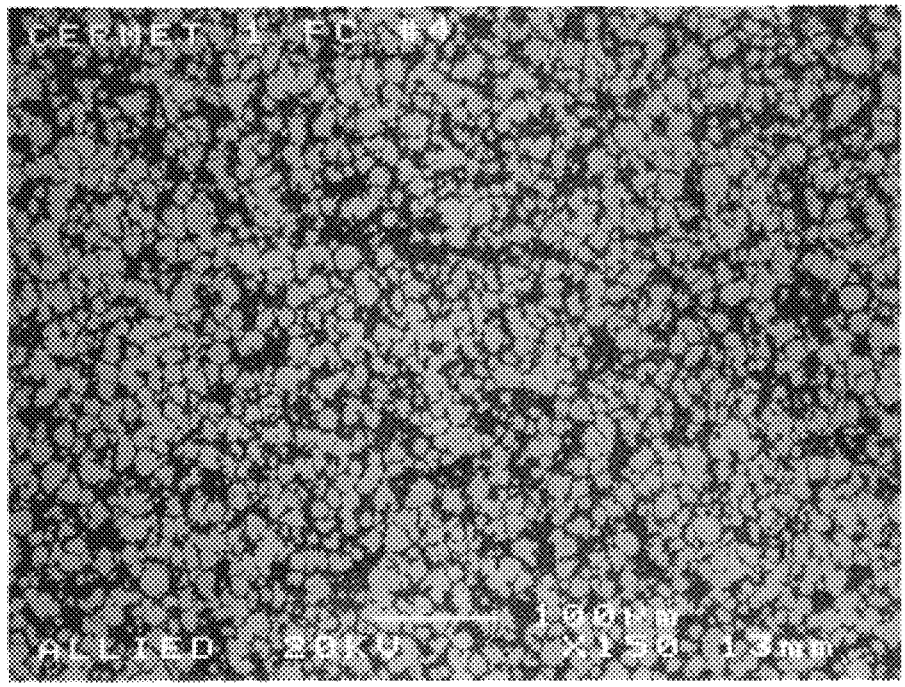
FIG. 3 is a photograph of a SEM micrograph showing uniform distribution of the ceramic and metal phases.
Figure 3B:
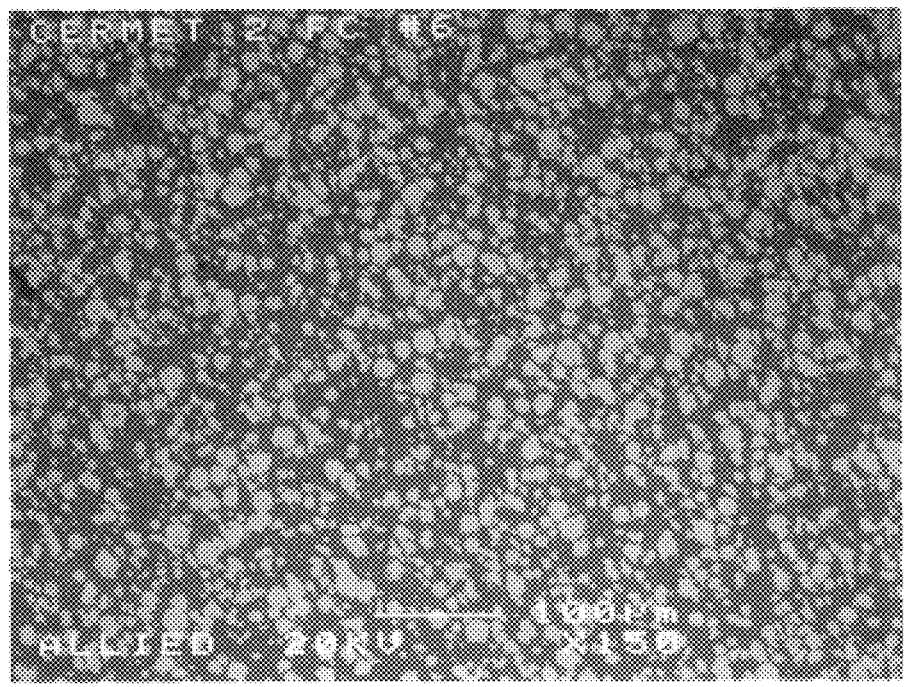

As shown in FIG. 2, the composite molding compounds of the present invention can be molded to net or near-net shape finished products. After injection molding, the molded green parts are fired at approximately 1350 to 1450° C. for a period of about 2 to 4 hours to produce finished parts having the desired properties.

The following examples are presented to provide a more complete understanding of the invention. However, the specific techniques, conditions, materials, proportions and reported data set forth to illustrate the principles and practice of the invention are exemplary and should not be construed as limiting the scope of the invention.

EXAMPLE 1

A composite mixture of 33 wt % (51 vol %) aluminum oxide ($Al_2O_3$) powder and 66.7 wt % (49 vol %/) 316L stainless steel powder was prepared. Aluminum oxide in the amount of 2800 g was mixed with 933 g of deionized water containing 1 wt % (solids basis) ammonium polyacrylate solution and a sufficient amount of tetramethylammonium hydroxide (TMA) to adjust the pH of the mixture to 9.85. The powder/water mixture was ball milled for about 5 hours to reduce the average particle size to approximately 1.1 $\mu$m. An aliquot of 1867 g of the suspension (containing 1400 g powder) was mixed with 42 g agar, 1.4 g calcium borate, 0.39 g methyl-p-hydroxy benzoate and 0.29 g propyl-p-hydroxy benzoate in a sigma blender for about 10 minutes at room temperature. Thereafter, 2800 g of 316L stainless steel powder was added to the blender and mixed at room temperature for about 15 minutes. The temperature was increased to 93° C. and mixing continued for about 45 minutes. After the material was allowed to cool to room temperature, it was removed from the blender and shredded into a particulate format using a food processor (Kitchen Aid KSM90). The shredded feedstock was dried to an 87.4 wt % solids level by exposing a loose bed of the material to the atmosphere. Parts were molded in the shapes of tensile bars, C-clamps and plates, as shown in FIG. 2, using a 200 to 900 psi injection pressure at approximately 80 to 95° C. on Boy 15S and 55 ton Cincinnati injection molding machines. Following molding, the parts were dried at ambient conditions and fired at approximately 1350° C. to 1450° C. for about 2 to 4 hours.

EXAMPLE 2

A composite molding compound was prepared using the procedures of Example 1, except that this composition contained 50 wt % (about 34 vol %) ceramic powder and 50 wt % (about 66 vol %) metal powder. The batch was dried to an 89.55 wt % solids level. Rectangular plates (1.9"×2.5"×0.27") were molded using a 200–300 psi injection pressure at 85° C. on the Boy 15S injection molding machine.

EXAMPLE 3

In this example the composite molding compound consisted of 10 wt % (18.3 vol %) aluminum oxide ($Al_2O_3$) and 90 wt % (81.7 vol %) 316L stainless steel powders. Deionized water, agar and the other processing aids described in Examples were added to the sigma blender. The temperature was raised to 93° C. and the agar was allowed to melt completely. 3780 g of 316L stainless steel powder was added to the melt and mixed for about 30 minutes. At this stage 560 g of $Al_2O_3$ slip (containing 420 g of $Al_2O_3$ powder; preparation as in Example 1) was added to the sigma blender and mixed for an additional approximately 40 minutes. The material was allowed to cool to room temperature, followed by the same shredding and moisture adjusting procedures as described in Example 1. Test bars and C-clamps were molded in a Boy 15S injection molding machine from this compound.

What is claimed is:

1. A composite molding composition comprising:
   a) a mixture of a metal powder and a ceramic powder,
   b) a gel-forming material selected from the group consisting of polysaccharides and agaroids,
   c) a gel-forming material solvent, and
   d) a gel strength enhancing agent in the form of a borate compound selected from the group consisting of magnesium borate, calcium borate, zinc borate, ammonium borate and boric acid, said mixture being formulated in a blender that provides shearing action thereto and the blender being heated to raise the temperature of the mixture to about 75 to, 100° C.

2. The composition of claim 1, wherein the temperature of the mixture is raised to between about 80 to 95° C.

3. The composition of claim 1, further including a dispersant, a pH control substance, a biocide and a carrier.

4. The composition of claim 1, wherein the metal/ceramic powder mixture is in the form of a slip having a particle size of between approximately 1 to 60 $\mu$m.

5. The composition of claim 1, wherein the ceramic powder is in the form of oxides, carbides, nitrides, borides, suicides or combinations thereof, and the metal powder is in the form of ferrous and/or non-ferrous metals or metal alloys.

6. The composition of claim 1, wherein the composite mixture of metal powder and ceramic powder form reinforcement particles or a matrix having a volume fraction in a range from about 0.1 to 99%.

7. The composition of claim 6, wherein the volume fraction is in range from about 15 to 75%.

8. The composition of claim 6, wherein the volume fraction is in a range from about 15 to 40%.

9. The composition of claim 1, wherein the weight percent of solid material in the composition mixture is in the range of approximately 75 to 93 wt %.

* * * * *